(12) United States Patent
Romeo

(10) Patent No.: US 7,763,835 B2
(45) Date of Patent: Jul. 27, 2010

(54) DUAL-AXIS SOLAR TRACKER MOUNTED ON A TWO-SLOPE GRATE COLUMN

(76) Inventor: Manuel Lahuerta Romeo, Paseo de Aragon, 3, Alafajarin, Zaragoza (ES) 50172

( * ) Notice: Subject to any disclaimer, the term of this patent is extended or adjusted under 35 U.S.C. 154(b) by 1287 days.

(21) Appl. No.: 11/214,400

(22) Filed: Aug. 29, 2005

(65) Prior Publication Data

US 2006/0054162 A1 Mar. 16, 2006

(30) Foreign Application Priority Data

Sep. 3, 2004 (ES) ................................ 200402167

(51) Int. Cl.
*G01C 21/02* (2006.01)
(52) U.S. Cl. ..................... 250/203.4; 250/239
(58) Field of Classification Search ............. 250/203.4, 250/203.1, 239, 203.6; 136/244–248, 263; 126/600–628
See application file for complete search history.

(56) References Cited

U.S. PATENT DOCUMENTS 4,771,764 A * 9/1988 Cluff .......................... 126/577

* cited by examiner

*Primary Examiner*—Que T Le
(74) *Attorney, Agent, or Firm*—Bourque and Associates

(57) ABSTRACT

The invention relates to a solar tracker characterized by having photovoltaic panels arranged in spaced rows at different levels and two slopes, favoring their ventilation and the expansion of the frame; the panels being fixed by means of yokes and clips to a support (3) anchored to the H-shaped frame (4) resting on swivelling supports of a tower having little height supporting the entire structure, its tilt being variable by means of a tension device, the side longitudinal beams (4a) being extendible to house more rows of panels (1) since the remaining structural components, tower, bearings, column and base have been oversized for that purpose.

8 Claims, 3 Drawing Sheets

ововdfDUAL-AXIS SOLAR TRACKER MOUNTED ON A TWO-SLOPE GRATE COLUMN

OBJECT OF THE INVENTION

As indicated in the title of this specification, the present invention relates to a solar tracker of the type which is used, through systems tracking the path of the sun, to improve photovoltaic panel production by capturing maximum solar energy radiation for the longest possible time, providing said function with a series of improved features and performance and/or alternatives with respect to the known art.

More specifically, the invention consists of a solar tracker the structure of which, incorporating an easily accessible individual fixing system, the photovoltaic panels being aligned in rows on different levels on two slopes, with no contact between them, favouring ventilation and allowing them to freely expand and minimizing their structural resistance to wind, allows reaching large dimensions housing a larger number of photovoltaic panels.

FIELD OF THE INVENTION

This invention is applicable in the industry dedicated to the manufacture and installation of panels and structures intended for using solar energy.

BACKGROUND OF THE INVENTION

As is known, solar trackers are used to improve photovoltaic panel production by capturing maximum solar energy radiation during the longest possible time through systems following the path of the sun.

Many companies market solar trackers and there are many models with both single and dual-axis tracking, all of them having a series of common features discussed below:

Panel clustering in the smallest possible space by means of forming large surfaces at a single level.

This solution hinders panel cooling, reducing their yield due to the temperature increase at a ratio of 0.5% per ° C. This clustering is further limited due to panel expansion since the support structures are rigid and occasionally surrounded by a frame enclosing them, generating stresses between panels due to nighttime and daytime temperature differences. In most cases, the panels are fixed with anchors on the two shafts, preventing their expansion.

Another significant drawback is that resulting from their stability given that since they are planar surfaces, the anchor and rotation points are located outside the plane passing through their center of gravity, causing asymmetrical static loads limiting their weight and dimensions so as to not overload the rotation points.

This situation is worsened by the stresses resulting from the wind which generate thrusts and overturning moments making them rather unstable.

On the other hand, when carrying out what is known as "solar farms" by means of tracker clustering, it is necessary to use a large number of trackers, which requires occupying more terrain due to shadows, among other factors, which increases final costs in bases, trenches and electrical infrastructures.

Of the two solar tracker axes, azimuthal orientation and tilt, the first one is important since it provides a production gain in the order of 30%, while the second axis controlling tilt provides a gain in the order of 8%, being less significant.

The azimuth tracking axis can furthermore be easily carried out since it is exclusively a time function and therefore uniform throughout the year; the second axis, the tilt axis, varies according to the ellipse of the sun, and its tracking is more complex and occasionally, due to its little gain, it is not worth carrying it out since it complicates the tracker mechanism and reduces its strength.

In fact most large trackers installed until now have only single-axis tracking.

Another aspect to be taken into account is the lack of foresight with respect to future expansions since most investors in this field at first have doubts or limited resources and begin with smaller installations which in a short time are to be expanded. This expansion is complicated and expensive if it has not been foreseen from the beginning.

The advances in this field involve the design of larger, stronger and more reliable trackers designed for a useful life of up to 25 years, which are less sensitive to the wind and provide the panels, and therefore inverters, with better conditions of durability and performance, in turn reducing the specific costs.

The new Royal Decree 436/2004, dated March 12, increases the premium price for photovoltaic electrical generation up to 100 kW, therefore the manufacture of large trackers is currently required to move forward in this matter.

DESCRIPTION OF THE INVENTION

The present invention has therefore conceived a solar tracker having the object of solving the previously discussed drawbacks, designed with the best installation conditions so that it provides the photovoltaic panel, a key element in the installation, with maximum protection and effectiveness during its useful life.

To that end the solar tracker is configured such that at its top portion the photovoltaic panels are placed in rows arranged in a spaced manner at different levels and on two slopes, leaving enough space between them so that no shadows are produced between panels at sunrise or at mid-day, allowing the subsequent installation, i.e. in an expansion phase, of the rows located at the ends.

Each panel is supported by yokes to which the panel is anchored by means of clips screwed to the frame, these clips in turn being secured in a locked manner to a support pipe and spaced from one another according to the width of the panel, the support pipes with their corresponding yokes forming each one of the aforementioned rows of panels of the solar tracker, their number varying according to installation dimensions and requirements.

The support pipes incorporate half-flanges functioning as an anchor to the frame, which adopts an H shape and supports the entire structure, the side longitudinal beams being especially designed for being extendible and housing more rows of panels, as discussed.

The frame is made up of a central large section pipe forming the H and resting on two swivelling supports provided on the tower of the structure, arranging a connecting rod where it is fixed by means of a tension device responsible for changing the tilt of the tracker either manually according to the latitude or the season when a single-axis tracker is carried out, or automatically, assembling in its place an automatically controlled servo cylinder or photosensitive cells that will control the tilt of the tracker in order to achieve dual-axis tracking.

The tower is in turn screwed on the top ring of a large bearing, the bottom face of which is suitably cut so that it engages in the pinion of a geared motor responsible for providing azimuthal orientation with great precision, the bottom ring of said bearing being screwed to the flange of the column where the geared motor is fixed.

This column having a large diameter advantageously has an auto-ventilated accessible door and has plates positioned therein on which the inverters will be fixed that are responsible for transforming the direct current provided by the panel into sine wave alternating current, as is required for connection to the electrical network.

The column is ventilated through the air flow entering through said door and exiting through grated ports, such that when the temperature inside it raises above the expected temperature, an exhaust will start up driven by a 0.1 kW motor that pushes the air flow to remove the heat and improve the performance of the inverters and prolong their useful life.

Finally the column is embedded in the concrete forming the base, the structure being fixed through a plurality of radial steel anchoring rods strengthening the assembly, while the cables joining the inverters to the electrical network pass through the base sheathed in an elbow in order to access the electrical network through a trench dug in the ground.

The new solar tracker thus allows the panel to function focused on the sun and at the lowest possible temperature since it provides good ventilation dissipating its heat, i.e. opening up spaces between panels.

On the other hand the aluminium frame protecting the panel contracts and expands with temperature changes every 24 hours, therefore the spaces provided in the new solar tracker allow exercising this expansion, preventing unwanted stresses that may cause straining and breaking.

Furthermore, since the solar tracker incorporates an individual, easily accessible fixing system, it allows easy replacement and/or verification of proper functioning.

In turn the inverters responsible for transforming the direct current into alternating current for operating machines or simply for connection to the electrical system, are well-protected and ventilated, being located inside the column, as mentioned, which can be carried out by means of an accessible door with ventilation ports (until now the inverters have been placed outside, contained in outdoor waterproof cabinets hindering heat dissipation, being more expensive).

The bearing responsible for supporting stresses and guiding rotation is of a large diameter, capable of supporting large weights and overturning moments. The intersection between column and base occurs in a much larger area, so that the point-based stresses on said intersection are remarkably reduced.

The invention provides the possibility of changing the tilt of the tracker for every month or season of the year by means of incorporating an adjustable tension device, thus optimizing the most favourable tilt angle without excessively complicating the tracker and obtaining an additional gain in the order of 4%.

Finally the design of the tracker is conceived such that it allows being expanded without new construction works. To that end the common elements such as the base, column, bearing and frame are oversized, taking into account this future expansion.

These particularities make it possible with this design for the solar tracker to be manufactured with large dimensions, allowing improving the stability and strength of the installation, providing the panels, and particularly the inverters in this type of installation, better performance while at the same time reducing specific costs and occupation of terrain.

On the other hand, the design of the solar tracker of the invention particularly considers the structural performance of the assembly and its stability against wind since the intention is to build structures over 10 m² that are able to house about 80 panels with over 15 kWp of power.

The new solar tracker therefore represents an innovative structure having structural and constitutional features that are unknown until now for such purpose, reasons for which, in combination with its practical utility, provide it with sufficient grounds for obtaining the exclusive right being sought.

DESCRIPTION OF THE DRAWINGS

To complement the description being made and for the purpose of aiding to better understand the features of the invention, a set of drawings is attached to the present specification as an integral part thereof which, with an illustrative and non-limiting character, shows the following.

PREFERRED EMBODIMENT OF THE INVENTION

Figure 1:
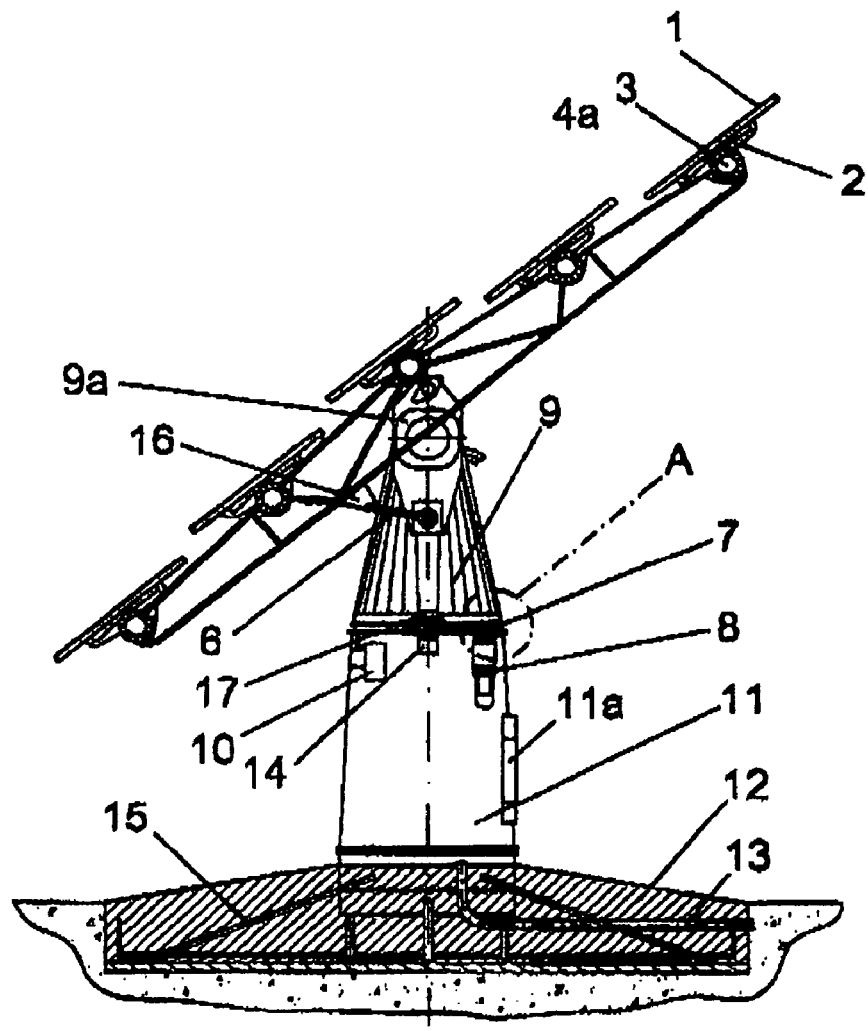
FIG. 1 shows a longitudinal section view of the new solar tracker according to the invention.

In view of the figures discussed and according to the reference numbers adopted, a preferred embodiment of the solar tracker can be observed therein comprising the parts indicated below:

1. Photovoltaic panel
2. Panel support yoke
2a. Fixing clip
3. Panel support pipe
4. Frame
4a. Frame longitudinal beam
4b. Central frame pipe
5. Anchor half-flange
6. Manual tilt tension device
7. Orientation rotation bearing
8. Geared motor
9. Tower
9a. Swiveling supports
10. Inverter fixing plate
11. Column
11a. Door
12. Concrete base
13. Cable duct
14. Ventilation port
15. Radial anchoring rod
16. Connecting rod
17. Exhaust As can be seen in FIG. 1, the solar tracker is thus configured so that the photovoltaic panels (1) are located at its top part in rows arranged in a spaced manner at different levels and on two slopes, the rows located at its ends being able to be installed later, i.e. in an expansion phase.

Figure 3:
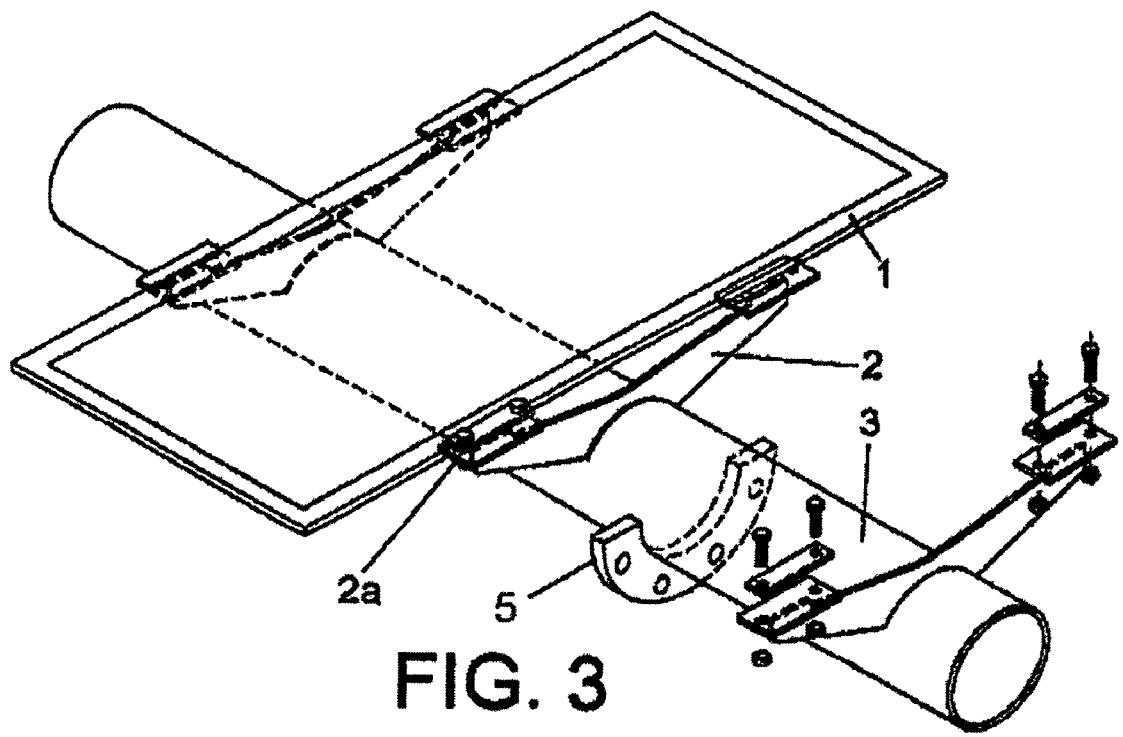
FIG. 3 shows an enlarged perspective view of the anchor assembly of the panel to the structure of the solar tracker.
Figure 4:
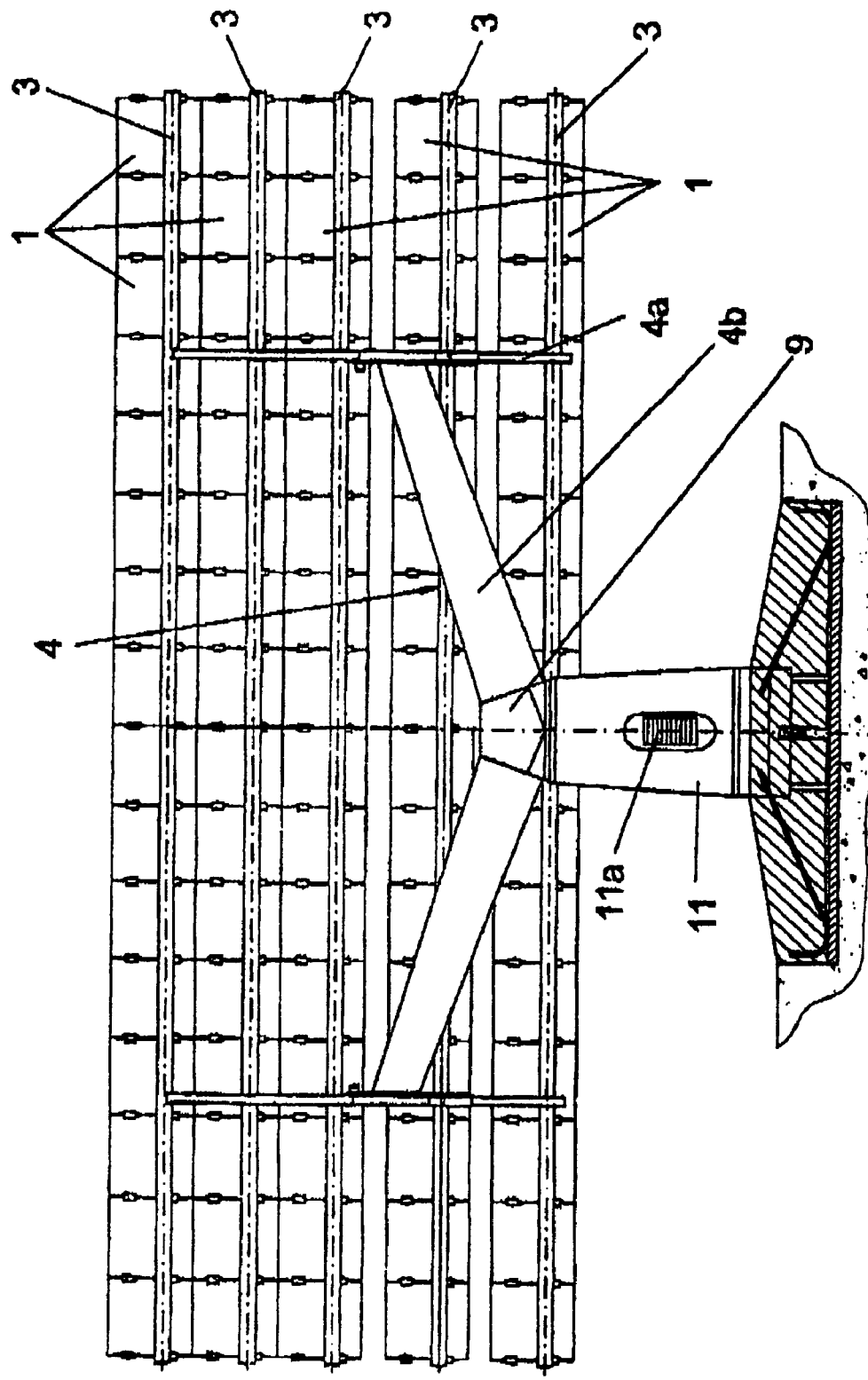
FIG. 4 shows a rear elevational view of the solar tracker.

Each panel (1) is supported by two parts in the form of a yoke (2) to which it is anchored by means of four clips (2a), as can be seen in FIG. 3, screwed to the frame of the panel (1). Said yokes (2) are in turn welded to a support pipe (3) and spaced from one another according to the width of the panel (1) plus the clamping screw, the support pipes (3) with their corresponding yokes (2) forming each one of the previously mentioned rows of panels (1) of the tracker, the number of which will vary according to the dimensions of the installation.

The support pipes (3) incorporate half-flanges (5) integral thereto functioning as an anchor to the frame (4).

This H-shaped frame (4) on two slopes supports the entire structure, the side longitudinal beams (4a) forming the H shape of the frame (4) being extendible to house more rows of panels (1) as previously mentioned.

For its part the frame (4) is made up of a large section central pipe (4b) forming the H and resting on two swivelling supports (9a) provided on the tower (9).

The central pipe (4b) has a connecting rod (16) where fixed by means of a bolt is the tension device (6) responsible for varying the tilt of the solar tracker according to the latitude or season, either manually when the tracker is a single-axis tracker, or automatically, assembling in its place a servo cylinder controlled by a robot or photosensitive cells that will control the tilt of the tracker to achieve dual-axis tracking.

Figure 2:
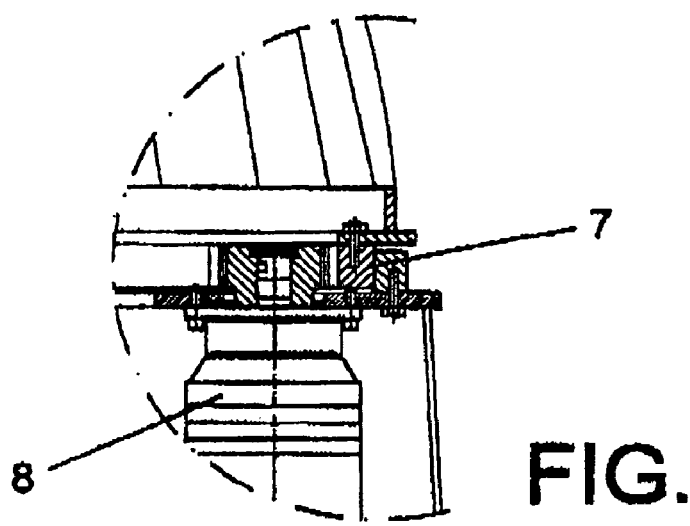
FIG. 2 shows an enlarged detail of the orientation rotation bearing mechanism of the tracker.

Said tower (9) is screwed on the top ring of a large bearing (7), the bottom face of which is cut so that it engages in the pinion of a geared motor (8) responsible for providing azimuthal orientation with great precision. For its part, the bottom ring of said bearing (7) is screwed to the flange of the column (11) where the geared motor (8) is fixed, as can be seen in detail A of FIG. 2.

The column (11) having a large diameter has an auto-ventilated accessible door and has plates (10) positioned therein where there are fixed inverters responsible for transforming the direct current provided by the panels (1) into sine wave alternating current as required for connection to the electrical network.

The column (11) is ventilated through the air flow entering through the door (11a) and exiting through the grated ports (14), such that when the temperature inside the column raises above the expected temperature, an exhaust (17) operated by a motor will start up, pushing the air flow to remove the heat and improve the performance of the inverters and prolong their useful life.

Finally the column (11) is embedded in the concrete forming the base (12), being assembled through a plurality of radial steel anchoring rods (15) strengthening the assembly, while the cables joining the inverters to the electrical network pass through the base sheathed in an elbow (13) to access the electrical network through a trench dug in the ground.

Having sufficiently described the nature of the present invention as well as the manner of putting it into practice, it is stated that the invention can be carried out to practice in other embodiments, within its essential features, differing in detail from the embodiment indicated by way of example, and these embodiments will also achieve the protection sought provided that the fundamental principle of the invention is not altered, changed or modified.

The invention claimed is:

1. A solar tracker, for supporting a plurality of photovoltaic panels, said solar tracker configured for moving said solar panels for tracking the path of the sun, said solar tracker comprising:
a plurality of photovoltaic panels (1) supported on the solar tracker and disposed in rows, said rows arranged in a spaced manner at different levels and on at least two different planes and pivotable about at least two different axes, said rows arranged in a spaced manner and at least in two different planes configured for allowing ventilation and expansion of the photovoltaic panels; wherein each photovoltaic panel (1) is supported by two parts, each part in the form of a yoke (2) to which each said photovoltaic panel is anchored by means of four clips (2a) screwed to the panel (1), wherein each yoke (2) is in turn welded to a support pipe (3), each support pipe spaced from one another according to the width of the photovoltaic panel (1), wherein the support pipes (3) with their corresponding yokes (2) supporting a plurality of photovoltaic panels form each one of said rows of panels (1) of the solar tracker.

2. The solar tracker according to claim 1, wherein the support pipes (3) incorporate half-flanges (5) integral thereto functioning as an anchor to the H-shaped frame (4) supporting the support pipes and plurality of photovoltaic panels, the H-shaped frame (4) including side longitudinal beams (4a) having a length and forming the H shape of the frame (4), said length of said longitudinal beams (4a) being extendible to support more rows of photovoltaic panels (1).

3. The solar tracker according to claim 2, wherein the frame (4) comprises a central pipe (4b) forming the H resting on two swiveling supports provided on a tower (9), wherein said tower (9) is secured on a top ring of a bearing (7), said bearing (7) having a bottom face which is cut so that it engages in a pinion of a geared motor (8) responsible for providing azimuthal orientation with great precision, and wherein the bottom ring of said bearing (7) is secured to a flange of a column (11) on which a geared motor (8) is fixed.

4. The solar tracker according to claim 3, wherein the column (11) has a large diameter and a door (11a) allowing access inside said large diameter column to plates (10) on which are mounted inverters responsible for transforming direct electrical current provided by the photovoltaic panels (1) into sine wave alternating electrical current as required for connection to an electrical network.

5. The solar tracker according to claim 4, wherein the column (11) is ventilated through the air flow entering through the door (11a) and exiting through grated ports (14) in said column, such that when a temperature inside the column raises above a preselected temperature, an exhaust (17) operated by a motor will start up.

6. The solar tracker according to claim 3, wherein the column (11) is embedded in concrete forming a base (12), said base being assembled with a plurality of radial steel anchoring rods (15) strengthening the base wherein electrical cables coupling the inverters to the electrical network pass through the base sheathed in an elbow (13) to access the electrical network through a trench dug in ground surrounding said base, wherein a vertical axis of the solar tracker is located along a vertical axis of swiveling supports (9a) located on a center region of the tower (9).

7. The solar tracker according to claim 3, wherein, the central pipe (4b) of the frame (4) has a connecting rod (16) to which is fixed by means of a bolt a tension device (6) responsible for varying the tilt of the solar tracker according to the latitude or the season.

8. The solar tracker according claim 3, wherein the central pipe (4b) of the frame (4) is coupled to a servo cylinder controlled by a robot or photosensitive cells, said servo cylinder configured for controlling the tilt of the solar tracker according to the latitude or the season.

* * * * *